3,313,638
CASTABLE REFRACTORY
Howard Edwin Konrad, Somerville, N.J., assignor to Johns-Manville Corporation, New York, N.Y., a corporation of New York
No Drawing. Filed May 17, 1965, Ser. No. 456,530
6 Claims. (Cl. 106—64)

This invention relates to hydraulic setting castable refractory cements of improved properties, and more particularly to castable refractories predominantly of calcium aluminate cement and clay designed for placement by casting or application through pneumatic or slap-troweling techniques which possess enhanced working characteristics.

Hydraulic setting refractory compositions containing appreciable quantities of clay and calcium aluminate cements low in lime frequently exhibit pronounced tendencies to separate or "creep" when admixed with water, resulting in poor working properties for casting and a decided lack of cohesiveness or "fattiness" which is significantly evidenced by inadequate adhesive properties whereby the cement will not stick or adhere upon pneumatic gun or slap-trowel application.

It is a primary object of this invention to provide means of overcoming the foregoing mentioned handicaps in the working characteristics and in particular the lack of adhesive properties in castable refractories predominantly composed of such calcium aluminate cements and clay which is economical and does not degrade the strength or other significant requisites or basic properties of the cement product.

It is also a primary object of this invention to provide a novel and improved castable refractory cement composition, or combination of components which is readily workable having a high yield point and good plastic deformation, and is highly cohesive and gelatinous possessing an optimum degree of "fattiness" and adhesiveness to the extent of tenaciously sticking and adhering upon forceful contact with vertical and horizontal refractory walls and ceilings, etc., upon application through conventional pneumatic gunning and slap-troweling techniques and means.

It is a further object of this invention to provide effective means of overcoming the deleterious effects of hydraulic setting retarding agents commonly incorporated in high alumina calcium aluminate cements which are frequently manifested by separation of "creep" of the material when admixed with water and evidenced by poor workability and the lack of cohesiveness and adhesion.

These and other objects and advantages of this invention will become evident from the hereinafter detailed disclosure.

This invention, in general, comprises the inclusion of a relatively small quantity of aluminum chloride with hydraulic setting castable refractories comprising a preponderance of clay and calcium aluminate cements low in lime, or the novel combination of the aluminum chloride agent with the clay and calcium aluminate cement, etc., refractory composition, whereby the aluminum chloride additament within the said collective environment, or the mutual effects of the interaction of the said components of the combination products significantly improved working and handling characteristics within the refractory cement.

Specifically this invention consists of the discovery that the addition or combining of only about 0.1 to about 0.25% by weight of aluminum chloride with a hydraulic setting refractory cement composed of at least about 50% by weight of its solids content of calcined clay and calcium aluminate cement, effects a marked beneficial difference in the consistency of wet admixtures of such products which facilitates their working and handling, enabling their application by conventional pneumatic gunning and slap-troweling techniques and means. The pronounced effect of this additament or the concerted interaction of the given combination including the same is demonstrated by the fact that refractory cements of clay and low lime content hydraulic setting calcium aluminate binders as the major components separate or "creep" upon wetting which renders them difficult to work and they will not adhere or stick when applied through conventional pneumatic gun or slap-troweling techniques, whereas the presence of only about 0.1 to about 0.25% by weight thereof of aluminum chloride introduces a high degree of cohesiveness or gelling and good plastic deformation facilitating working and rendering them readily and tenaciously adhesive upon contact. Moreover, this aluminum chloride additament in the prescribed amounts is completely compatible with such clay and calcium aluminate refractory cement systems, and does not introduce degrading effects such as diminishing their strength, etc.

The calcium aluminate cement compositions may comprise any of the conventional hydraulic setting calcium aluminate compositions containing less than about 25%, and typically less than about 20%, by weight of lime or CaO, including high alumina content calcium aluminate cements such as Alcoa's CA–25 cement. The clay component comprises calcined kaolin clays for high temperature castables for temperatures of about 2800° F. or higher. Additional amounts of plastic clays or ball clays are preferred to enhance the adhesion characteristics of the refractory castable compositions. Additional optional components of the castable cements of this invention include fused alumina, fine grouts, and refractory fillers, high temperature resistant low bulk fillers such as expanded perlite, calcined diatomaceous earth, etc.

The following example of a specific embodiment demonstrates a preferred and established formulation for the practice of this invention. It is to be understood that this example is given for purposes of illustration rather than limitation and that the specific constituents or product produced therefrom, techniques or procedures and conditions set forth are merely exemplary and are not to be construed as limiting the invention to any particular means or conditions given.

A high temperature hydraulic setting refractory formulated for slap-trowel or pneumatic gun application comprising the means or agent of this invention in combination with the heretofore utilized components was prepared by dry blending the following in percentage by weight:

| | Percent |
|---|---|
| Calcined kaolin clay (+35 to −35 mesh) | 68.3 |
| Hydraulic setting calcium aluminate cement (Alcoa CA–25) | 12.5 |
| Fused alumina (fines) | 12.0 |
| Raw kaolin clay | 7.0 |
| Aluminum chloride ($AlCl_3 6H_2O$) | 0.2 |
| Total | 100.0 |

This formulation, upon the addition of and mixing with apt quantities of water for slap-trowel application, provided a cement of high cohesive properties and "fattiness" which upon forceful contact or impingement with a refractory brick wall resulting from throwing or slinging trowel size masses thereof readily and tenaciously adhered to the brick surface and subsequently hydraulically set to provide a dense refractory coating or layer of high resistance to temperatures ranging up to about 3000° F. and good durability. The same formulation but without including the aluminum chloride, when mixed with water and handled in a like manner exhibited a pronounced tendency to separate and "creep," was difficult to work and would not adhere to the surface of the refractory brick wall when applied thereto under the same conditions.

Moreover, it was found that the addition of such small but efficacious quantities of aluminum chloride, as for example, 0.1 to 0.25% by weight of the solid constituents of the refractory, does not appreciably affect the strength or other basic properties of the cement. For instance, compressive strengths of like-prepared and oven dried cements of the foregoing composition both without any aluminum chloride and containing 0.1% and 0.2% by weight thereof of aluminum chloride additive were as follows:

|  | P.s.i. |
|---|---|
| 0.0% aluminum chloride | 2053 |
| 0.1% aluminum chloride | 2223 |
| 0.2% aluminum chloride | 1704 |

Although the concepts or means of this invention may apply to other areas of the refractory or hydraulic cement art, the present invention is primarily directed to hydraulic setting castable refractories composed predominantly of calcined clays and hydraulic setting calcium aluminate cements, for example, refractory cements comprising from approximately 50 to approximately 85% by weight of calcined clay, approximately 5 to approximately 30% by weight of calcium aluminate cement, approximately 5 to approximately 20% by weight of fused alumina fines and, pursuant to this invention, approximately 0.1 to approximately 0.25% by weight thereof of aluminum chloride. An optimum castable refractory cement formulation for slap-trowel or pneumatic gunning application pursuant to this invention would comprise approximately 60 to 75% by weight of calcined kaolin clay, approximately 10 to 15% by weight of hydraulic setting high alumina calcium aluminate cement, approximately 10 to 15% by weight of fused alumina, and approximately 1 to 15% by weight of a plastic clay such as raw kaolin, ball clays, etc. together with approximately 0.2% by weight thereof of aluminum chloride.

It will be understood that the foregoing details are given for purposes of illustration and not restriction, and that variations within the spirit of this invention are to be included within the scope of the appended claims.

What I claim is:

1. A hydraulic setting castable refractory cement having improved working and cohesive properties, consisting essentially of low lime content hydraulic calcium aluminate cement binder, clay, and aluminum chloride in amount of approximately 0.1 to approximately 0.25% by weight of the solid constituents.

2. A hydraulic setting castable refractory cement having improved working and cohesive properties, consisting essentially of low lime content hydraulic calcium aluminate cement binder, calcined clay, alumina, and aluminum chloride in amount of approximately 0.1 to approximately 0.25% by weight of the solid constituents.

3. A hydraulic setting castable refractory cement having improved working and cohesive properties, consisting essentially of approximately 5 to approximately 25% by weight of hydraulic calcium aluminate cement binder of low lime content, approximately 50 to approximately 85% by weight of calcined clay, 0 to approximately 20% by weight of alumina, and approximately 0.1 to approximately 0.25% by weight of aluminum chloride.

4. A hydraulic setting castable refractory cement having improved working and cohesive properties, comprising approximately 12.5% by weight of hydraulic calcium aluminate cement binder of low lime content, approximately 68.3% of calcined kaolin clay, approximately 12% by weight of fused alumina fines, approximately 7% by weight of raw kaolin clay and approximately 0.2% by weight of aluminum chloride.

5. A hydraulic setting castable refractory cement having improved working and cohesive properties, consisting essentially of approximately 10 to approximately 15% by weight of hydraulic calcium aluminate cement binder of low lime content, approximately 75% by weight of calcined kaolin clay, approximately 10 to approximately 15% by weight of fused alumina fines, approximately 1 to approximately 15% by weight of raw kaolin clay, and approximately 0.1 to approximately 0.25% by weight of aluminum chloride.

6. The method of improving the working and cohesive properties of hydraulic setting castable refractory cements consisting essentially of hydraulic calcium aluminate cement of low lime content and clay, consisting of the addition thereto of approximately 0.1 to approximately 0.25% by weight thereof of aluminum chloride.

References Cited by the Examiner

UNITED STATES PATENTS 3,181,959  5/1965  Raine et al. _____ 106—64

OTHER REFERENCES

Lea and Desch: The Chemistry of Cement and Concrete, Revised Edition, 1956, page 252.

TOBIAS E. LEVOW, *Primary Examiner.*

J. E. POER, *Assistant Examiner.*